United States Patent [19]

Barlow et al.

[11] 3,882,459

[45] May 6, 1975

[54] DEADTRACKING SYSTEM

[75] Inventors: George J. Barlow, Tewksbury; Donald R. Taylor, Framingham, both of Mass.

[73] Assignee: Honeywell Information Systems Inc., Waltham, Mass.

[22] Filed: May 2, 1974

[21] Appl. No.: 466,438

[52] U.S. Cl. .......................... 340/146.1 F; 360/26
[51] Int. Cl. .......................... G06k 5/00
[58] Field of Search .......... 340/146.1 F; 360/26, 38, 360/51

[56] References Cited

UNITED STATES PATENTS

| | | | |
|---|---|---|---|
| 3,262,097 | 7/1966 | Miller | 340/146.1 F |
| 3,539,992 | 11/1970 | Kernahan | 340/146.1 F |
| 3,685,021 | 8/1972 | Mauch et al. | 340/146.1 F |
| 3,729,708 | 4/1973 | Wolfer et al. | 340/146.1 F |
| 3,744,023 | 7/1973 | Carpentier et al. | 340/146.1 F |

*Primary Examiner*—Charles E. Atkinson
*Attorney, Agent, or Firm*—Faith F. Driscoll; Ronald T. Reiling

[57] ABSTRACT

A microprogrammed peripheral controller includes a deskew buffer including a plurality of clocked storage devices. Pairs of the clock storage devices of each register provides storage for a single information channel. Each channel is driven from a separate clock circuit which is enabled for operation only when circuits associated with the channel detect that information signals are being received by the channel indicating that the channel is "active" at the start of an actual record. The circuits for detecting the activity of a channel are included within the circuits which detect conditions occurring during the reading operation indicative of a channel failure. When the circuits detect that the channel is not active, they operate to switch a storage device to a predetermined state indicating a channel failure which causes the channel to be "dead tracked". Thereafter, both storage devices of a predetermined one of the pairs of the channel are switched to the same predetermined state for the remainder of the record reading operation causing correction circuits included in the controller to correct signal channel error conditions within that channel in the same manner that the circuits correct for other types of error conditions.

20 Claims, 7 Drawing Figures

DEADTRACKING SYSTEM

RELATED REFERENCES

1. U.S. Pat. No. 3,792,436 titled "A Deskewing Buffer Arrangement Which Includes Means for Detecting and Correcting Channel Errors", issued on Feb. 12, 1974 invented by David D. DeVoy, George J. Barlow and John A. Klashka and assigned to the assignee named herein.

2. "Noise Record Processing for Phase Encoded Data", Ser. No. 320,229 filed on Jan. 2, 1973, and now U.S. Pat. No. 3,810,231 invented by David D. DeVoy, George J. Barlow and John A. Klashka and assigned to the assignee named herein.

3. "Error Detection and Correction Apparatus For Use In A Magnetic Tape System", Ser. No. 358,770 filed on May 9, 1973, and now U.S. Pat. No. 3,803,552 invented by George J. Barlow and John A. Klashka and assigned to the assignee name herein.

BACKGROUND OF THE INVENTION

1. Field of Use

This invention relates to checking circuits and more particularly to circuits for detecting the existence of a "dead" track.

2. Prior Art

It is well known to provide circuits for detecting when a track or information channel was in error. In such schemes, a dead track (bad information on a track) is indicated only when it is not possible to obtain valid data from the track. In prior art systems, the detection apparatus makes the determination by monitoring some characteristic of the data being passed through the channel. Specifically, each track is monitored for phase error and each byte of data is monitored for parity error. The combination of the two error signals are then used to set an indication of the dead track.

The above prior art schemes presume that the channel apparatus used for timing or sensing the condition of a phase error was operating properly at the beginning of the reading operation. Furthermore, it is assumed that the channel clock circuits have been operating reliably for some period of time which is normally required for attaining synchronization between the data pulse signals and the clocking signals. Accordingly, it can be seen that where a channel is not supplying data signals that the detection circuits would cause a channel to be dead tracked only after considerable processing of a record had been accomplished. Moreover, since the channel clock circuits have their frequency adjusted in accordance with the data signals during the initial portion of the record processing, a loss in data signals caused by a dead channel can render it very difficult if not impossible to again synchronize the channel clocking circuits to the incoming data signals.

Accordingly, it is an object of the present invention to provide improved apparatus for detecting the presence of a dead track on a recording medium.

It is a further object of the present invention to provide reliable arrangement for detecting the presence of dead tracks or channels.

It is a more specific object of the present invention to provide for the detection and correction of dead channels utilizing a minimum of apparatus.

SUMMARY OF THE INVENTION

The above objects are achieved according to the teachings of the present invention by providing apparatus which detects the presence of a "dead channel" independently of the state of the recovered information being deskewed.

In accordance with the preferred embodiment, each information channel driven from a separate clock circuit includes circuits for detecting that the recovered information signals are being received. When the channel circuits detect that the channel has not received information for a predetermined period of time during the initial portion of a record (i.e. preamble), the circuits are operative to generate a signal to circuits also included within the channel which detect other conditions occuring during the reading operation indicative of a channel failure. These circuits include a storage device which is switched to a predetermined state by the signal generated by the channel circuits which causes that channel to be dead tracked for the remainder of the record reading operation. Thereafter, a pair of storage devices of a predetermined one of the pairs of storage devices for the channel are switched to the same predetermined state causing correction circuits within the system to correct single channel error conditions for the channel which has been dead tracked in the same manner that the correction circuits correct for other types of error conditions.

By providing circuits for detecting the activity of a channel during the initial processing of a record which corresponds to processing the preamble information of a record, the problem of improperly adjusting the frequency of the clock circuits of a channel is thereby eliminated. This in turn eliminates the possibility of detecting other error conditions during the processing of the data portion of the record caused by improper correction of the clock circuits frequency rendering its timing unreliable for sampling the recovered information.

By utilizing the fault circuits included within a channel and correction circuits included within the deskew buffer apparatus, the detection and correction for dead track channels is made with a minimum of additional circuits.

The above and other objects of this invention are achieved in the preferred embodiment disclosed hereinafter. Novel features which are believed to be characteristic of the invention, both as to its organization and method of operation, together with further objects and advantages will be better understood from the following description when considered in connection with the accompanying drawings. It is to be expressly understood, however, that these drawings are for the purpose of illustration and description only and are not intended as a definition of the limits of the present invention.

DESCRIPTION OF THE PREFERRED EMBODIMENT

Figure 1:
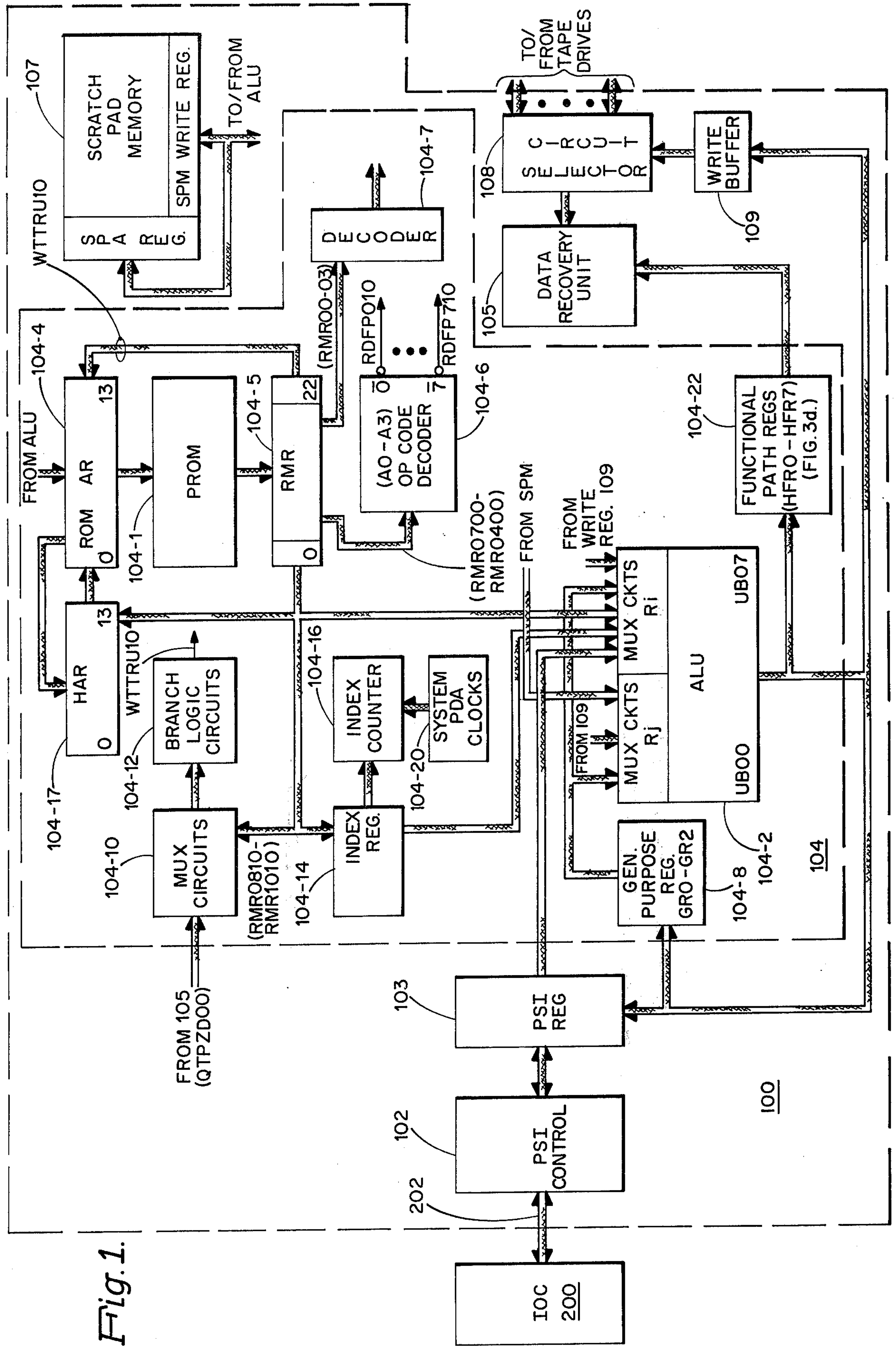
FIG. 1 shows in block diagram form a system which utilizes the detection and correction apparatus of the present invention.

FIG. 1 shows a peripheral processor 100 which couples to a central processing unit of a data processing system, not shown, via an input/ouput processor (IOC) 200. The peripheral processor or peripheral controller 100 in response to commands received from the IOC 200 process data received from any one of a number of magnetic tape devices, not shown.

Commands and data transferred between the IOC and peripheral processor 100 via a peripheral subsystem interface (PSI) 202. Such transfers are made in response to control signals generated by circuits included within the IOC 200 and PSI control 102. For the purpose of the present invention, the circuits can be considered conventional. These types of circuits may take the form of circuits described in a copending patent application titled "Microprogrammable Peripheral Processing System", invented by John A. Recks et al. bearing Ser. No. 425,760 which was filed Dec. 18, 1973 and is assigned to the same assignee as named herein.

As seen from FIG. 1, the peripheral processor 100 includes a microprogrammed processing unit 104 which under the control of microinstructions stored in a programmable read-only memory 104-1 performs the necessary operations for transferring data between a magnetic tape drive and IOC 200. For example, in response to command code bytes received from the IOC 200 and applied via the PSI control 102, PSI register 103 and Arithmetic and Logic Unit (ALU) 104-2 microinstructions are read out into a memory register 104-5 and decoded by decoder circuits 104-6 and 104-7. This causes the generation of various control signals which condition the other portions of the peripheral processor 100 to perform operations necessary for executing the type of command specified.

Additionally, as seen from FIG. 1, signals from the memory register 104-5 are also applied to multiplexer circuits 104-10, conventional in design, which additionally receive control and status signals from other portions of the system such as a data recovery unit 105 for testing the progress of a particular operation as explained herein. Actual testing is accomplished by branch logic circuits 104-12 which can be considered conventional in design. Also, signals representative of addresses contained within various types of microinstructions are applied from register 104-5 to a further pair of registers 104-14 and 104-16. The register 104-14 is an index register which couples to an index counter 104-16 and is used to provide required timing or strobe signals necessary for writing or reading information characters to and from the write buffer 109 and the data recovery unit 105 respectively as explained further herein. The index counter 104-16 is decremented in response to PDA clocking signals generated by system clock circuits 140-20. For the purpose of the present invention, these circuits can be considered conventional in design. The register 104-17 serves as a history address register for providing proper sequencing through microinstructions stored in memory 104-1.

As seen from FIG. 1, the ALU 104-2 receives and delivers signals to the registers shown. The signals which are to be applied as operand inputs to the ALU 104-2 are selected via multiplexer circuits included therein. The ALU 104-2 and muliplexer circuits can be considered conventional in design and may take the form of circuits disclosed in a text titled "The Integrated Circuits Catalog For Design Engineers", published by Texas Instrument Inc., dated 1972. The ALU 104-2 is connected to provide output signals to a plurality of functional path registers 104-22 which are used for control purposes such as providing control signals to the data recovery unti 105. Additionally, the ALU 104-2 is also connected to receive and transmit signals from and to a plurality of general registers 104-8 (i.e. registers GRO–GR2) which are used for maintaining certain record processing information.

Also, the peripheral processor 100 includes a scratch pad memory 107 which provides temporary storage for data, various control information and parameters required in executing various types of read and write operations. As seen from FIG. 1, both address and data are transmitted to and from the scratch pad memory 107 via the ALU 104-2.

The information characters or frames read from a magnetic tape device via a selector circuit 108, is processed by the data recovery unit 105. Information to be written on a magnetic tape device is transferred via the ALU 104-2 to write buffer 109 and thereafter applied to a selected magnetic tape drive via selector circuit 108. Since the present invention is primarily concerned with operations which take place during the reading of data records, certain portions of the peripheral processor 100 will not be described in further detail except as to the extent necessary in understanding how a read operation takes place.

DATA RECOVERY UNIT 105

Figure 2:
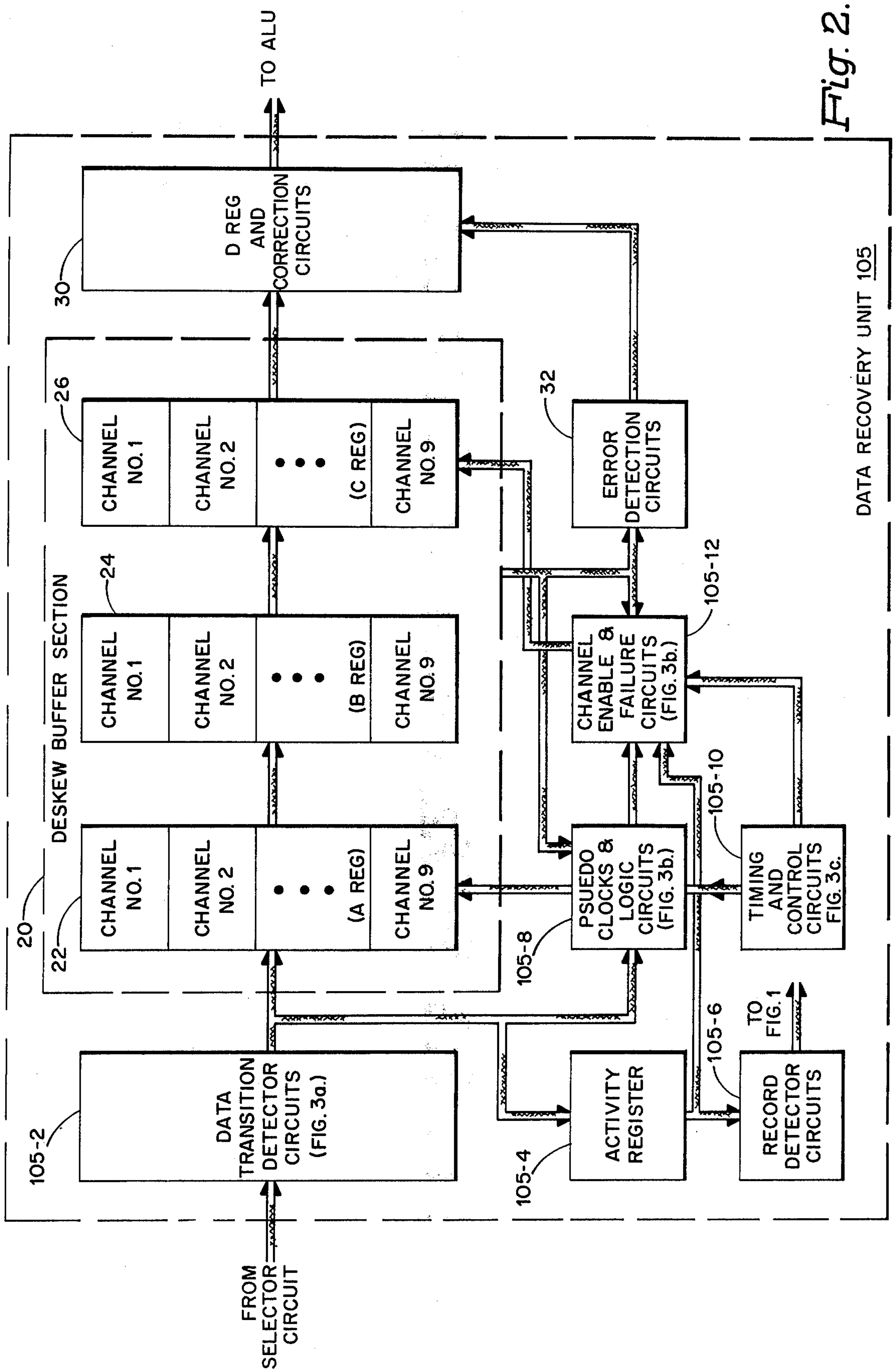
FIG. 2 shows in block diagram form and Data Recovery unit of FIG. 1.

Referring to FIG. 2, it is seen that the data recovery unit 105 includes a deskew buffer section 20 which includes registers 22, 24 and 26 arranged as shown. These registers are operative to deskew phase encoded pulse information signals representative of binary ONES and binary ZEROS into data characters assembled in register 26 which are then transferred to register 30 and then to the ALU 104-2 of FIG. 1. Each of the channel sections of each of the registers include a pair of synchronous or clocked flip-flops which derive their timing from the system PDA clock circuits 104-20. Additionally, certain ones of the flips-flops included within registers 22, 24 and 26 receive clocking signals from individual pseudo clock and logic circuits of block 105-8. These signals define intervals or "windows" during which the pulses representative of binary ONES and binary ZEROS are to be sampled. The circuits are shown in block diagram form in FIG. 3*b*.

Figure 3A:
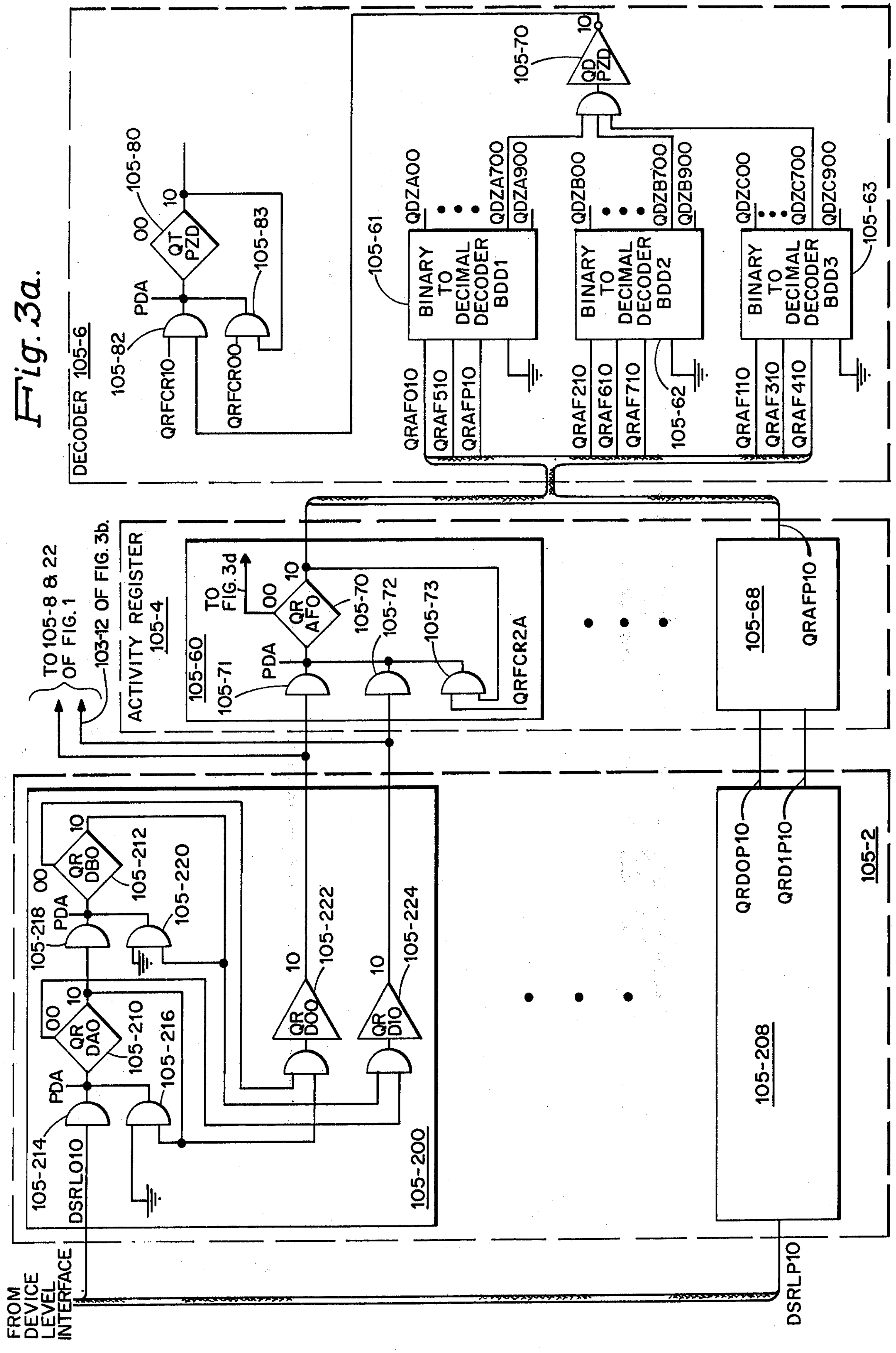
FIG. 3*a* shows in greater detail the Activity Register and Record Detector Circuits of FIG. 2.
Figure 3B:
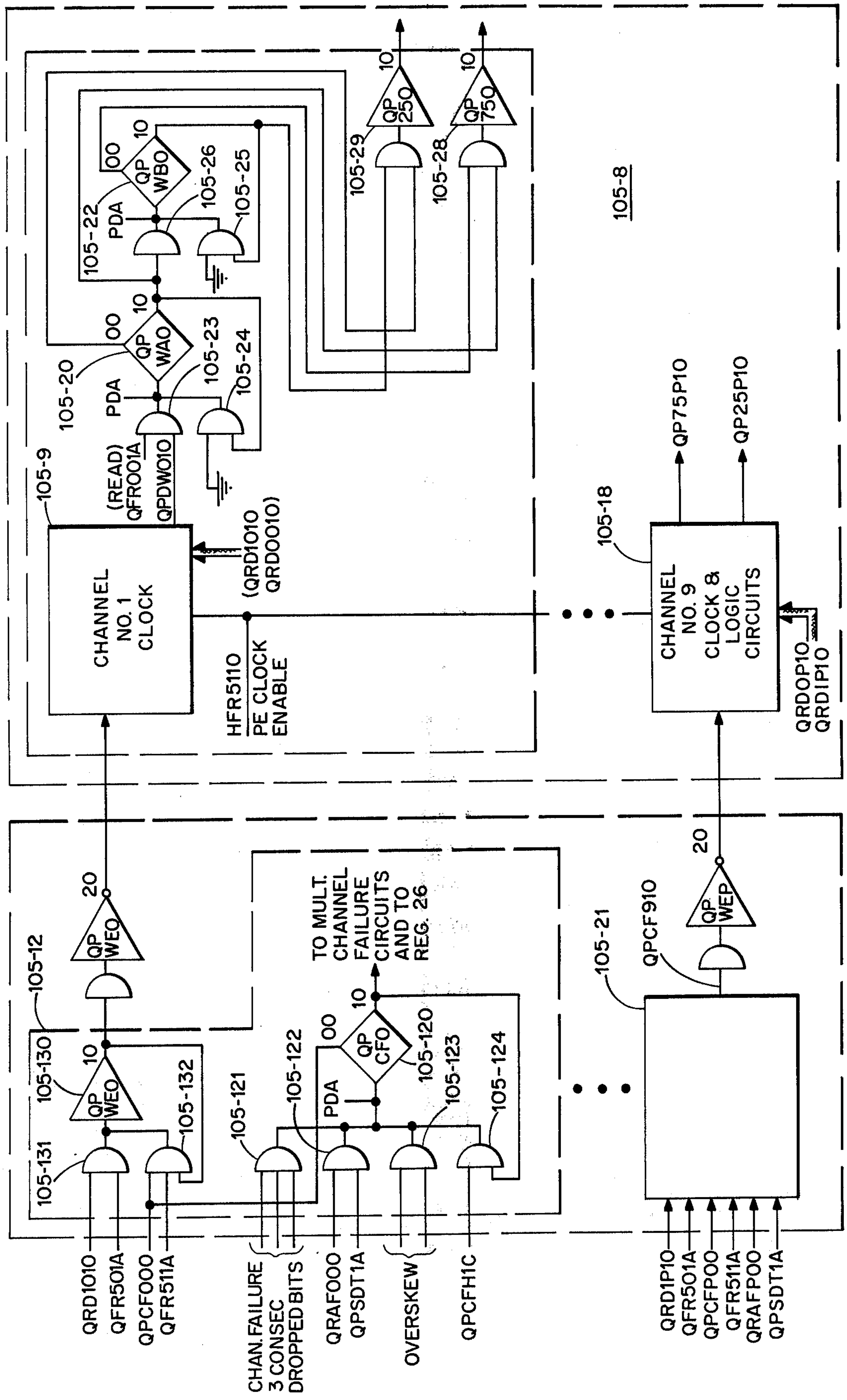
FIG. 3*b* shows in greater detail the Pseudo Clock Circuits and Channel Failure Circuits of FIG. 2.

Referring to FIG. 3*b*, it is seen that the pseudo clocks and circuits 105-8 include a pseudo clock circuit for each channel which can for the purpose of the present invention be considered conventional in design. For example, the clock circuit may include a voltage controlled oscillator circuit whose frequency is adjusted in accordance with the input data rate. Each pseudo clock circuit includes circuits which define a "window pulse interval signal" (e.g. signal QPDW010) which in turn is used to drive a pair of series connected flip-flops 105-20 and 105-22 set and reset by AND gates 105-23 through 105-26 arranged as shown. A pair of AND gates and amplifier circuits 105-29 and 105-28 convert the window pulse signals into a set of pulses which define the 25 percent and 75 percent point of a bit cell interval. Specifically, signal QP25010 and QP25P10 respectively define the 25 percent points for the channels 1 and 9 buffer circuits. Similarly, signals QP75010 and QP75P10 respectively define the 75 percent points for channels 1 and 9 buffer circuits.

Each of the clock circuits are enabled by a corresponding one of the circuits 105-12 through 105-21. The enabling and channel failure circuits of each channel include a channel failure flip-flop (e.g. flip-flops 105–120) with associated AND gates coupled for receiving signals representative of channel failure conditions as explained herein (e.g. gates 105–121 through 10,–124). The binary ONE output of the channel failure flip-flop is applied to the corresponding pair of flip-flops which comprise register 26 of FIG. 2. Additionally, the signal is forwarded to multiple channel failure circuits which decode the channel failure and signal the detection of multiple failures to determine the extent of correction which can be made to characters or frames assembled in register 26. The binary ZERO output signal of the channel failure flip-flop is applied as a hold input to an enabling amplifier circuit 105–130 which includes a pair of AND gates 105–131 and 105–132 arranged as shown. The enabling circuit of each channel (e.g. 105–130) forces its output to a binary ONE state in response to a pulse from one of the transition detector circuits (e.g. signal QRD1010) when the peripheral processor 100 forces a signal QFR501A to a binary ONE. When this occurs, the enabling circuit causes a further inverter circuit (e.g. inverter circuit 105–140) to switch its output to a binary ZERO which in turn allows the clock circuits to generate "window timing signals" (e.g. signal QPDW010). Of course when the enabling circuits are inhibited from forcing the corresponding inverter output signals to binary ZEROS, the channel clocking circuits are inhibited from generating the window signals. It is only in response to these window signals that the 25 percent and 75 percent set of pulse signals are generated thereby allowing the channel to transfer data signals through the pairs of flip-flops comprising the deskew buffer section 20. For further information regarding the details of the buffer section 20, register and correction circuits 30 and error detection circuits 32, reference may be made to the previously cited references and in particular U.S. Pat. No 3,792,436.

Continuing on with the description of the data recovery unit 105, it is seen that the data transition detector circuits 105-2 for each channel comprise a plurality of flip-flops (e.g. flip-flops 105–210 and 105–212) connected in series which are set and reset via pairs of AND gates (e.g. AND gates 105–214 through 105–220). The first flip-flop of each pair of flip-flops is set in response to change in state of signals representative of binary ONE and binary ZERO phase encoded information received from a selected tape device via selector circuit 108. The output signals from these pair of flip-flops are combined in a pair of AND gates which convert the input signal levels to pulses corresponding to a binary ONE and binary ZERO phase encoded data pulses. These gates correspond to AND gate and amplifier circuits 105–222 and 105–224. The output pulse signals are applied to the register 22 of FIG. 2, the pseudo clock circuits 105-8 and appropriate flip-flops which comprise the activity register 105-4.

As seen from FIG. 3*a*, each channel includes a single activity flip-flop which is set in response to binary ONE and binary ZERO data pulses. Each of the flip-flops 105–60 through 105-68 include a pair of input gates (e.g. 105-71 and 105-72) which are connected to receive binary ZERO and binary ONE data pulses respecitvely. A hold AND gate (e.g. gate 105-73) of each activity flip-flop is held on during the processing of each data record by signal QRFCR2A. The outputs of the activity flip-flops 105-60 through 105-68 are selectively combined in a decoder which comprises a portion of the record detector circuits 105-6. The decoder 105-60 includes a plurality of binary to decimal decoder circuits 105-61 through 105-63 which receive input signals from selected ones of the activity register flip-flops. When all three input signals to any one of the decoder circuits 105-61 through 105-63 are binary ONES, that decoder circuit forces a corresponding one of the output signals QDZA700, QDZB700 or QDZD700 to a binary ZERO. This in turn causes an AND gate inverter circuit 105-70 to be forced to a binary ONE. This in turn causes a phase encoding zone detector flip-flop 105-80 to be switched to a binary ONE state via an AND gate 105-82. When this flip-flop switches signal QTPZD10 to a binary ONE, it signals that a minimum of three channels have received signals and that this may be the start of an actual record. As explained herein, when the microprogrammed processing unit 104 detects that a predetermined number of successive frames have been detected measured by sampling the state of signal QTPZD10, it switches one of the flip-flops of a specified functional path register to a binary ONE indicating the start of an actual record. For additional information regarding the selection of criteria for dtermining when an actual record has been sensed, refernce may be made to the related references and in particular the patent application titled "Noise Record Processing for Phase Encoded Data".

Figure 3C:
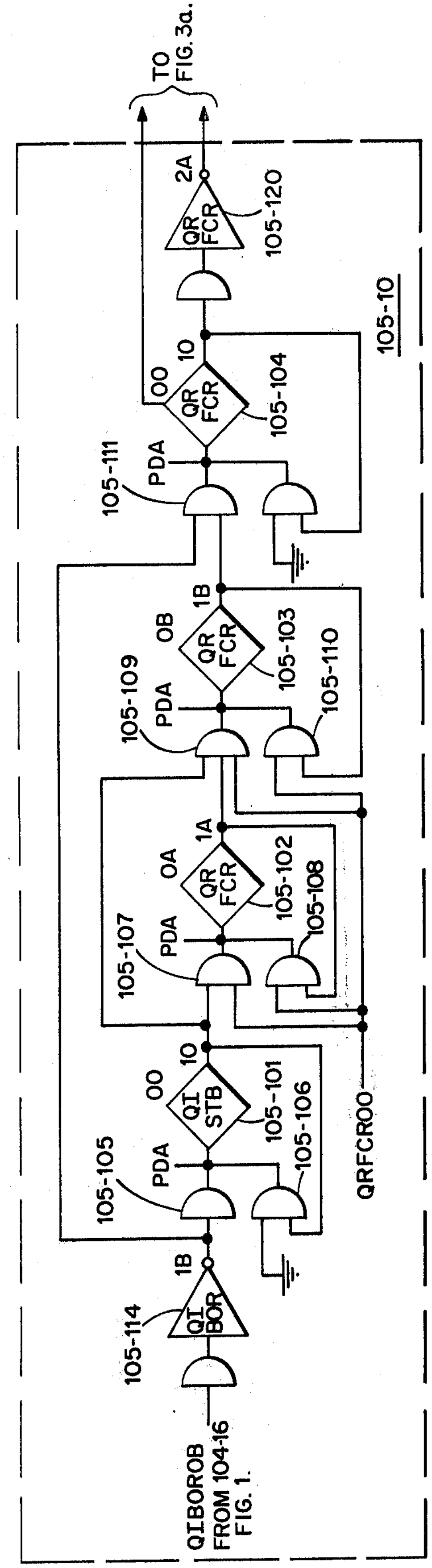
FIG. 3*c* shows in greater detail the Timing and Control Circuits of FIG. 2.
Figure 3D:
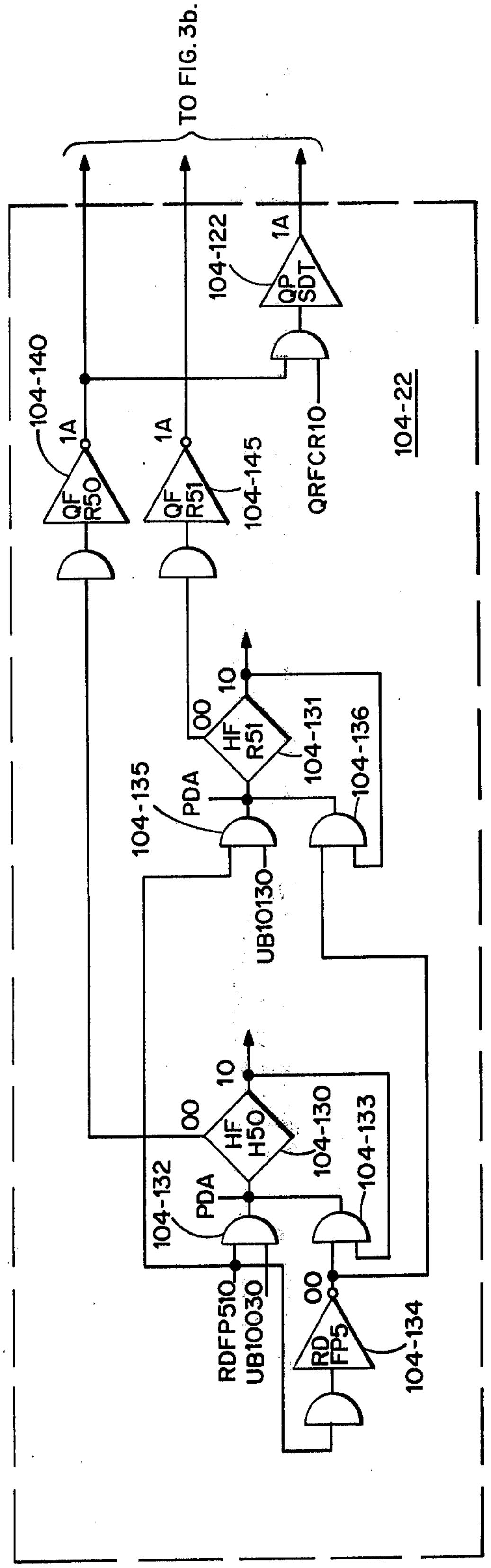
FIG. 3*d* shows in greater detail a portion of the functional Path Registers 104–122.

In the present peripheral processor 100, the timing and control circuits 105-10 of FIG. 3*c* provide timing signals used in measuring timing intervals used in the processing record frames. Referring to that figure, it is seen that the circuits include a plurality of series connected clocked flip-flops 105-101 through 105-104 which include a plurality of gates 105-105 through 105-112 as shown. The flip-flops 105-101 through 105-104 operate as a shift counter generating pulses at the designated time intervals in response to signals from the index counter 104-16 which establishes the time durations for these intervals. Specifically, the first flip-flop 105-101 operates as a 0.5 frame timer which is set via a signal QIBOROB applied via a gate and inverter circuit 105-114 each time the index counter 104-16 of FIG. 1 decrements to ZERO. The flip-flop 105-104 serves as a 1.5 frame timer and is operative to generate 1 PDA width pulses at 1.5 frame time intervals. The time intervals are established by presetting the index counter 104-16 with a count stored in index register 104-14 each time the counter 104-16 decrements to ZERO. Initially, the index register 104-14 is loaded with a count via the ALU 104-2 by the processing unit 104. FIG. 3*d* shows a portion of one of the functional path registers (HFR5) 104-22. This register which includes flip-flops 104-130 and 104-131 and circuits 104-132 through 104-136 is loaded with signals from the ALU 104-2 in response to a control signal RDFP510 generated by op code decoder circuit 104-6. As explained herein, the processing unit 104 switches flip-flop 104-131 to a binary ONE when it detects that 5 consecutive frames of a record have been processed signaling the presence of an actual data record. The processing unit 104 switches flip-flop 104-130 to a binary ONE when it detects that approximately 25 additional frames or characters have been processed at which time the clocks of the data recovery unit 105 are enabled as explained herein. In both instances, the processing unit 104 accomplishes the switching of the functional path register flip-flops by executing microinstructions which cause constants to be delivered to the register HFR5 via the ALU 104-2.

As seen from FIG. 3*d*, the binary ZERO output signals from flip-flops 140-130 and 140-131 are inverted by gate and inverter circuits 104-140 and 104-145 respectively. Also, the inverted signal QF5011A is applied to an AND gate and amplifier circuit 104-122 along with timing signal QRFCR10 for generating the set dead track signal QPSDT1A.

DESCRIPTION OF OPERATION OF THE PREFERRED EMBODIMENT

Figure 4:
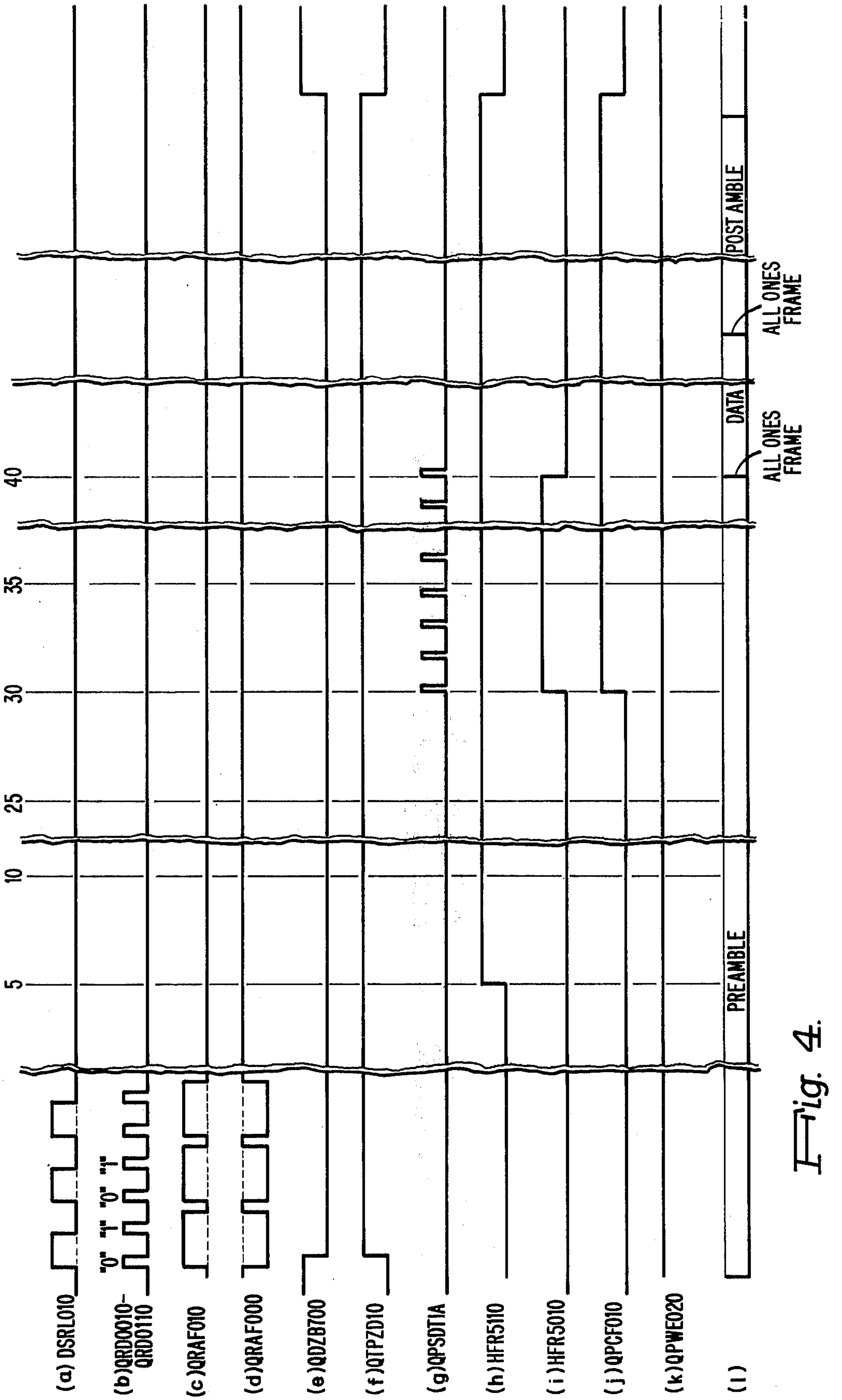
FIG. 4 illustrates a series of waveforms used in explaining the operation of the present invention.

With reference to FIGS. 1, 2, 3*a* through 3*d*, the operation of the present invention will be described referring to the waveforms of FIG. 4. Waveform e of FIG. 4 illustrates that an actual data record includes a synchronization or preamble portion which includes approximately 40 frames of all ZERO characters and an all ONES frame marking the end of the preamble portion, a data portion including data characters and another all ONES frame marking the end of that portion and a postamble portion including another group of all ZERO characters followed by an interrecord gap or space. The first part of waveform a shows signal transitions representative of an all ZERO bit pattern occurring in channel 0 which is applied as signal DSRL010 to the transition detectors 105-2 of FIG. 3*a*. As illustrated by waveform b, the positive and negative transitions applied to the channel data transition detector circuits 105-200 are converted into pulses representative of binary ZEROS and binary ONES. Because the frame or read character is an all ZERO character, the binary ZERO information corresponds to the pulses drived from positive going transitions while the binary ONE information is phase information which corresponds to pulses derived from the negative going transitions. The pulses are applied to the input of the channel activity flip-flop 105-60 via AND gates 105-222 and 105-224. This flip-flop is reset at 1.5 frame intervals by signal QRFCR2A of FIG. 3*c*. Referring to that Figure, it is seen that this signal is normally a binary ONE when the 1.5 frame flip-flop 105-104 is in a binary ZERO state.

It will be appreciated that prior to beginning record processing, the peripheral processor 100 is operative to load the index register 104-14 of FIG. 1 with a count which corresponds to a 0.5 frame interval. This count is loaded into the index counter 104-16 which is then decremented in response to PDA clock pulses applied thereto. When the counter has decremented to zero terminating the end of a 0.5 interval, it switches the .5 frame flip-flop 105-101 to a binary ONE state. The index counter is then again preset to the count stored in index register 104-16 and the operation is repeated in the same manner. Following the occurrence of three 0.5 frame intervals, the 1.5 frame flip-flop 105-104 switches to its binary ONE state, forcing signal QRFCR2A to a binary ZERO which resets the activity flip-flop 105-60. As seen from waveform *b* during a frame interval, two pulses are normally applied to the activity flip-flop 105-60 which is operative to change state as indicated by the waveforms *c* and *d* of FIG. 4.

Referring to FIG. 3*a*, it is seen that the phase encoding zone detector flip-flop 105-80 will be switched to its binary ONE state when any one of the decoder circuits 105-61 switch corresponding ones of the output signals QDZA700 through QDZC700 respectively to binary ZEROS. This signals that at least a minimum of three channels have sensed signals from their respective channels. In this example, it is assumed that initially each of the data transition detector circuits of channels 2, 5, and 8 have sensed signals which in turn cause them to force signals QRAF210, QRAF610, and QRAF710 to binary ONES. This in turn causes decoder circuit 105-62 to force signal QDZB700 to a binary ZERO causing gate and inverter circuit 105-70 to switch flip-flop 105-80 to a binary ONE state as illustrated by waveforms *e* and *f* of FIG. 4. It will also be noted from waveform f of FIG. 4 that the signal QTPZD10 remains a binary ONE. This assumes that the signals from at least three channels are received continuously. It will be appreciated that in the event they are not received continuously, the flip-flop 105-80 is switched to a binary ZERO state at the end of a 1.5 frame interval when flip-flop 105-104 switches to a binary ONE (i.e. signal QRFCR10 switches to a binary ZERO).

As mentioned previously, the state of signal QTPZD10 applied to the branch logic circuits 104-12 is sampled by the processing unit 104 at frame intervals and cause a count stored in one of the general purpose registers 104-5 to be decremented by one. When the count decrements to zero, the ALU 104-2 generates a signal which causes the processing unit 104 to execute a microinstruction which loads a constant into functional path register HFR5 (i.e. forces signal RDFP510 to a binary ONE). This forces flip-flop 104-131 to a binary ONE indicating that 5 consecutive frames of information have been processed and which forces signal HFR5110 to a binary ONE as illustrated by waveform *h* of FIG. 4.

The signal HFR5110 is applied to all of the pseudo clock and logic circuits enabling them to begin to synchronize their timing to pulses representative of binary ONE and binary ZERO information from corresponding ones of the data transition detector circuits. However, it should be appreciated that the clock circuits remain inactive in that they are still inhibited from producing output window signals required in the sampling of the pulses from the detector circuits applied to the deskew buffer section 20 of FIG. 2.

During the switching of flip-flop 104-131 to a binary ONE, another count corresponding to 25 is loaded into one of the general registers. This count after each frame interval is decremented by one via the ALU 104-2 in response to signal QTPZD10 in the same manner as the previous count. When the ALU 104-2 decrements the count to zero, another constant is loaded into functional path register HFR5 in response to signal RDFP510 generated by decoder circuit 104-6 of FIG. 1. This causes flip-flop 104-130 to be switched to a binary ONE as illustrated by waveform i of FIG. 4. When flip-flop 104-130 switches to a binary ONE, gate and inverter circuit 104-40 forces signal QFR501A to a binary ONE which conditions AND gate 104-122 to begin generating the set dead track signal QPSDT1A at 1.5 frame intervals in response to timing signal QRFCR10. This is illustrated by waveform *g* of FIG. 4.

The first occurrence of signal QPSDT1A when applied to the channel failure flip-flop 105-120 of FIG. 3b switches it to a binary ONE because the channel is not active as indicated by the binary ONE state of signal QRAF000 from channel activity flip-flop 105-60 of FIG. 3*a*. Since it is assumed in this example that only channel "0" is "dead", the remaining channel failure flip-flops are still in their binary ZERO states. When flip-flop 105-120 switches to a binary ONE, it inhibits latching switch 105-30 from being switched from a binary ZERO to a binary ONE when signal QF5011A is switched to a binary ONE.

As seen from FIG. 4, signal QPWE020 remains a binary ONE which inhibits the clock circuits 105-9 of channel "O" from generating the window signal QPDWO10. Channel "O" is dead trakced for the entire record and the information is corrected automatically in response to the indicator signals forced into register 26 by channel failure signal QPCF010.

It will be noted from FIG. 4 that the set dead track signal QPSDT1A is generated as long as signal HFR5010 remains a binary ONE. Flip-flop 104-130 which generates signal HFR5010 remains in a binary ONE until the deskew buffer section 20 detects that the all ONES frame has been stored in the D register 30 of FIG. 2. This causes the branch logic circuits 104-12 in FIG. 1 to condition the processing unit 104 to reference a microinstruction which loads another constant into functional path register HFR5 via the ALU 104-2 in response to signal RDFP510 generated by decoder circuit 104-6 switching flip-flop 104-130 of FIG. 3d to a binary ZERO.

When flip-flop 104-130 switches to a binary ZERO, gate and inverter circuit 104-140 force signal QFR501A to a binary ZERO, disabling the set dead track AND gate 104-122. As seen from FIG. 3b, when the set dead track signal QPSDT1A switches to a binary ZERO, the channel failure flip-flops are no longer permitted to respond to channel activity. Thus, it is only during the intial start of the record that the channel failure flip-flops can be switched on as a consequence of a loss of activity. It will be appreciated that during the processing of the data record, other ones of the input channel failure AND gates can be set in response to error conditions arising from processing of frames of data (e.g. a number of consecutive dropped bits, overskew error conditions).

By enabling the clock circuits to generate timing signals only after the apparatus of the present invention detects that the channels are active, the data recovery circuits are prevented from responding to unreliable and inaccurate timing signals. Also, by using a number of common circuits, the invention increases the overall reliability of the system.

It will be appreicated by those skilled in the art that many changes may be made to the illustrated embodiment. For example, different types of clocking and enabling circuits may be used in combination with the invention.

To prevent undue burdening the description with matter within the ken of those skilled in the art, a block diagram approach has been followed, with a detailed functional description of each block and specific identification of the circuits it represents. The individual engineer is free to select elements and components such as flip-flop circuits, shift registers etc. from the individual's own background or from standard references such as those mentioned herein.

It will be also noted that the exact format and coding of the microinstructions were not disclosed herein since the engineer is free to select alternate forms. For further details and insight into techniques for deriving such microinstructions and for additional background information concerning microprogrammed systems, reference may be made to the text titled "Computer Design Fundamentals" by Chu, McGraw-Hill Book Company, Inc., Copyright 1962 and the text titled "Microprogramming Principles and Practice" by S. S. Husson, Prentice-Hall, Inc., Copyright 1970.

While in accordance with the provisions and statutes there has been illustrated and described the best form of the invention known, certain changes may be made without departing from the spirit of the invention as set forth in the appended claims and that in some cases, certain features of the invention may be used to advantage without a corresponding use of other features.

Having described the invention, what is claimed is:

1. Apparatus for detecting inactivity in a plurality of tracks of a medium read by a device and applied to a corresponding number of channels of a data recovery system, each of said channels including a number of series coupled deskew buffer registers including first and second bistable storage means and clocking means, said first and second bistable storage means of at least a first one of said buffer registers of each channel being coupled to said clocking means for receiving of clocking signals defining bit intervals for sampling information signals read from said tracks during said intervals and each byte of information corresponding to a group of bit signals simultaneously recorded on said tracks of said medium and then applied by said device as signal transistions to said channels, said apparatus comprising:

a plurality of input transition detector means, the input detector means of each channel being operative in response to said signal transitions to produce pulses representative of a binary ONE and a binary ZERO to first and second lines respectively coupled to said first and second bistable storage means of said first one of said buffer registers;

a plurality of activity circuit means corresponding in number to said input detector means, each coupled to said first and second lines of a different one of said plurality of said input detector means and being operative to switch from a first to a second state in response to pulses applied to said first and second lines;

a corresponding number of bistable channel failure indicator means, each coupled to a different one of said activity circuit means and to a corresponding one of said clocking means of said channel; and, control means being operative upon detecting that an initial group of bytes have been received from said device to generate signals for enabling each of said clocking means for generating said sets of clocking signals, said control means being coupled to each of said channel failure indicator means and operative to condition said each channel failure means concurrent with generating said signals to be switched from a first to a second state only when said activity circuit means is in said first state for inhibiting the enabling of said channel clocking means by said signals to prevent transfer of incorrect information through each channel of an inactive track.

2. The apparatus of claim 1 further including:

means coupled to said channel failure indicator means of said each channel and to said first and second bistable storage means of a predetermined one of said deskew buffer registers, said means being conditioned by said channel indicator means when in said second state to force said first and second bistable means to the same predetermined state during succeeding bit intervals signaling that the information transferred through said each channel requires correction.

3. The apparatus of claim 2 further including checking means coupled to receive byte signals from a last one of said buffer registers, said checking means being operative in accordance with the results of performing a checking operation upon said by signals to generate a signal for correcting information stored in said first bistable means of each said channel.

4. The apparatus of claim 1 further including:

a plurality of enabling switching circuit means, each coupled to a different one of said clocking means and to a corresponding one of said channel failure indicator means, each said enabling circuit means being selectively enabled in response to pulses from one of said lines during a predetermined interval defined by said signals generated by said control means only when said channel failure indicator means switches from said first to second state during said predetermined interval and each of said channel failure means including input gating means coupled to receive status indicative of a channel failure detected during the processing of subsequently received data bytes, said each channel failure means being conditioned by said control means to switch from said first to said second state following said predetermined interval only in response to said status signals.

5. The apparatus of claim 4 wherein said apparatus further includes:

a plurality of decoder circuit means, each coupled to different selected ones of said activity circuit means and each operative to generate output signals indicating that pulses are being received from said device at a predetermined rate and circuit means coupled to said plurality of decoder circuit means, said circuit means being operative to condition said control means to generate said signals only upon being conditioned by continuous application of said output signals for a predetermined period indicating that processing of a number of a predetermined type of bytes has been completed.

6. The apparatus of claim 5 wherein said bytes received from said device comprise a data record having preamble and postamble sets of bytes bracketing data bytes and separated by a byte having a predetermined code of said record for enabling the synchronization of each of said clocking means to said data recovery apparatus, said control means including means operative to generate said signals only during receipt of bytes of said preamble for said predetermined period.

7. The apparatus of claim 6 wherein said control means includes means operative in response to a signal indicating the sensing of said byte having said predetermined code to inhibit each of said channel failure indicator means from being switched to said second state by said activity circuit means associated therewith.

8. The apparatus of claim 7 wherein each of said activity circuit means includes bistable storage means including first and second gating means coupled to receive pulses from said first and second lines and hold gating means coupled to said control means, said control means including timing means for generating signals at predetermined intervals for enabling the resetting of said bistable means in the absence of pulses being received from said first and second lines indicative of an inactive track.

9. The apparatus of claim 8 wherein each of said input transition detector circuits includes;

a pair of series connected clocked bistable means, a first one of said pair being connected to receive said transistion signals from said device and each of said bistable means being operative to generate pairs of complementary output signals and first and second AND gating means connected to receive a different predetermined one of said pairs of output signals to produce pulses on said first and second lines respectively in response to positive and negative signal transitions.

10. A controller system including data recovery apparatus for reliably processing information bytes of data records recorded within a plurality of tracks on a magnetic medium, each of said data records including at least a preamble portion having a plurality of bytes for synchronizing the timing of said system to the information bytes being read, each byte of information corresponding to a group of bit signals simultaneously recorded on said tracks and applied to said system as bilevel signals, said data recovery apparatus including a plurality of channels corresponding in number to said tracks, each channel comprising:

a plurality of series coupled bistable buffer means, a first one of said buffer means coupled to receive pulses representative of binary ONE and binary ZERO information derived from said bilevel signals;

clocking means coupled to at least said first one of said buffer means, said clocking means operative to apply clocking signals defining bit intervals for sampling pulses derived from a corresponding one of said tracks; and, channel failure indicator means coupled to said clocking means and to receive said pulses, said indicator means including means operative in response to a control signal indicating a start of a predetermined interval during which only bytes of said preamble portion are received to switch said channel failure indicator means from a first to a second state in the absence of receiving said pulses within a predetermined interval indicating the presence of an inactive track condition, said channel failure indicator means when in said second state being operative to inhibit the enabling of said clocking means for generating said clocking signals during the processing of said data record.

11. The control system of claim 10 wherein said data recovery apparatus further includes:

control means including;

first means being conditioned by said system to switch from a first to a second state generating a first control signal when a predetermined number of bytes of said preamble portion has been read from said plurality of tracks and second means coupled to said first means and to each of said channel failure indicator means, said second means in response to said first control signal being operative to generate signal during successive intervals for conditioning said absence of said pulses within said predetermined time interval.

12. The system of claim 11 wherein said system being operative to condition said first means upon detecting receipt of all of the bytes of said preamble portion signaling the end of said predetermined interval to switch state inhibiting generation of said first control signal and said second means being operative in the absence of said first control signal to inhibit generation of said signals for the remainder of said record disabling each of said channel failure indicator means from switching state in response to an inactive track condition causing disabling of said clocking means.

13. The system of claim 12 wherein said each channel further includes activity circuit means coupled to receive said pulses representative of binary ONE and binary ZERO information and coupled to said second means and to said channel failure indicator means, said second means being operative to condition said activity circuit means during said predetermined intervals to generate signals indicating said absence of said pulses for causing the switching of said channel failure indicator means.

14. The system of claim 13 wherein said each channel further includes transition detector means coupled to receive said bilevel signals derived from a track associated therewith, said detector means including;

a pair of series connected clocked bistable means, a first one of said pair being connected to receive said bilevel signals and each of said bistable means being operative to generate pairs of complementary output signals and first and second AND gating means connected to receive a different predetermined one of said pairs of output signals and operative to produce said pulses in response to positive and negative going transitions in said bilevel signals.

15. The system of claim 10 wherein said plurality of series coupled bistable buffer means of each channel each include first and second bistable storage means and wherein said channel further includes means coupled to said channel failure indicator means and to a predetermined one of said buffer means, said means being conditioned by said channel failure indicator means when in said second state to force said first and second bistable means to the same predetermined state during succeeding bit intervals signaling that the signals transferred through said channel requires correction.

16. The system of claim 15 wherein data recovery apparatus further includes checking means coupled to receive byte signals from a last one of said buffer means of each of said channel, said checking means being operative in accordance with the results of performing a checking operation upon said byte signals to generate a signal for correcting said signals stored in said first bistable means of said last one of said buffer means during the subsequent processing of said data record.

17. The system of claim 11 wherein said each channel further includes:

enabling switching circuit means coupled to said channel clocking means, said channel failure indicator means and to said first means, said enabling circuit means being selectively enabled in response to pulses representative of binary ONE information during said first control signal only when said channel failure indicator means switches from said first to said second state and said channel failure means including input gating means coupled to receive status signals indicative of a potential channel failure detected during the processing bytes of said data record, said channel failure means being conditioned to switch from said first to said second state in response to said status signals at the completion of said predetermined interval.

18. In a data recovery system, apparatus for detecting at least first and second types of potential failure conditions during a transfer of information pulses through one of a plurality of channels, each of said channels including input means for generating pulses representative of a bit of information to first and second output lines, each byte of information corresponding to a group of bit signals simultaneously recorded on a medium being read and said each channel further including a plurality of buffer registers, each of said registers including first and second bistable storage means and clocking means coupled to a first one of said buffer registers for applying sets of clocking signals defining bit intervals for sampling said pulses during said intervals, said apparatus comprising:

a plurality of activity circuit means, each coupled to said first and second output lines of a channel, said each activity circuit means being operative to switch from a first to a second state in response to said pulses;

a plurality of bistable channel failure indicator means, each coupled to a different one of said activity circuit means and to a corresponding one of said clocking means, each of said channel indicator means including at least first and second means for receiving signals representative of first and second types of potential failure conditions, said first means being coupled to said activity circuit means and operative only during an initial transfer of pulses to said input means representative of a predetermined type of byte signals for synchronizing the operation of said clocking means to cause said channel failure means to switch from a first to a second state when said activity circuit is in said first state and said second means being operative to cause said channel failure means to switch from said first to said second state only after the disabling of said first means at the end of receiving said predetermined type of byte signals.

19. The apparatus of claim 18 further including:

means coupled to said channel failure indicator means of said each channel and to said first and second bistable storage means of a predetermined one of said buffer registers, said means being conditioned by said channel indicator means when in said second state to force said first and second bistable means to the same predetermined state during succeeding bit intervals signaling that the information transferred through said each channel requires correction.

20. The apparatus of claim 19 further including checking means coupled to receive byte signals from a last one of said buffer registers, said checking means being operative in accordance with the results of performing a checking operation upon said byte signals to generate a signal for correcting information stored in said first bistable means of each said channel.

* * * * *

UNITED STATES PATENT OFFICE

CERTIFICATE OF CORRECTION

PATENT NO. : 3,882,459

DATED : May 6, 1975

INVENTOR(S) : George J. Barlow & Donald R. Taylor

It is certified that error appears in the above-identified patent and that said Letters Patent are hereby corrected as shown below:

Column 10, line 39, after "receiving" insert --sets--.

Column 11, line 27, delete "by" and insert --byte--.

Column 12, line 26, delete "transistion" and insert --transition--.

Column 13, line 14, delete "signal" and insert --signals--.

Signed and Sealed this

*nineteenth* Day of *August 1975*

[SEAL]

*Attest:*

RUTH C. MASON
*Attesting Officer*

C. MARSHALL DANN
*Commissioner of Patents and Trademarks*